(12) United States Patent
Tschopp

(10) Patent No.: US 6,270,247 B1
(45) Date of Patent: Aug. 7, 2001

(54) MIXING AND KNEADING APPARATUS

(75) Inventor: Patrick Tschopp, Pratteln (CH)

(73) Assignee: Buss Compounding Systems AG, Prattelin (CH)

( * ) Notice: Subject to any disclaimer, the term of this patent is extended or adjusted under 35 U.S.C. 154(b) by 0 days.

(21) Appl. No.: 09/336,265

(22) Filed: Jun. 18, 1999

(30) Foreign Application Priority Data

Jul. 10, 1998 (CH) .................................................. 1481/98

(51) Int. Cl.⁷ ....................................................... B01D 7/00
(52) U.S. Cl. .......................... 366/289; 366/78; 366/331; 277/908
(58) Field of Search .............................. 366/78, 289, 331; 277/346, 511, 520, 527, 534, 634, 908

(56) References Cited

U.S. PATENT DOCUMENTS 4,408,769 * 10/1983 Wolff .
4,443,015 * 4/1984 Duffee et al. .
4,878,677 * 11/1989 Larkins et al. .
5,048,847 * 9/1991 Kovacs et al. .

* cited by examiner

Primary Examiner—W. L. Walker
Assistant Examiner—David Sorkin
(74) Attorney, Agent, or Firm—Tarolli, Sundheim, Covell, Tummino & Szabo L.L.P.

(57) ABSTRACT

A mixing and kneading device comprises a mixing and kneading shaft mounted in a housing and driven to a rotating as well as to a reciprocating movement. For sealing the housing, there is provided a sealing assembly located between the housing and the mixing and kneading shaft. The sealing assembly includes a supporting assembly arranged between the housing and the mixing and kneading shaft and provided with first and second sealing means. The supporting assembly is locked against rotation, but coupled to the mixing and kneading shaft to perform therewith its reciprocating movement. The first sealing means serves for rotatively seal the mixing and kneading shaft and is located between the mixing and kneading shaft and the supporting assembly. The second sealing means provides for a translative sealing of the mixing and kneading shaft and is located between the supporting assembly and the housing.

18 Claims, 2 Drawing Sheets

MIXING AND KNEADING APPARATUS

BACKGROUND OF THE INVENTION

The present invention refers to a mixing and kneading apparatus, comprising a housing delimiting a work space, a working member located in the interior of the housing, a drive assembly for driving the working member to a rotating and to a reciprocating movement, and a sealing assembly located between the housing and the working member. Further, the invention also refers to a sealing assembly for sealing a working member located in a housing and driven to a rotating and reciprocating movement, whereby the sealing assembly is located between the housing and the working member.

Mixing and kneading apparatuses of the kind referred to herein are used, for example, for processing highly viscous masses, for homogenizing and plastifying plastic materials and for admixing fillers and reinforcing additives to such masses.

In order to provide for mixing and processing these materials as homogeneously as possible, such mixing and kneading apparatuses comprise a working member, e.g. a shaft member provided with mixing and kneading vanes, that is driven not only to a rotating movement, but simultaneously to a reciprocating movement as well. One difficulty in using a rotating and simultaneously reciprocating working member consists in the fact that it is very difficult to seal that working member vis-a-vis the housing in such a way that a perfect seal is maintained over an extended period of time. Moreover, caused by the two motions of the working member superimposed to each other, a wobbling motion of the working member can result what renders a reliable sealing even more difficult to achieve.

PRIOR ART

For the purpose of sealing such rotating and simultaneously reciprocating working members, usually elastically resilient sealing members have been used in the past that can absorb both radial deflections and relative axial shifts of the mixing and kneading shaft. However, experience has shown that the life cycle of such sealing members is very limited.

OBJECTS OF THE INVENTION

Therefore, it is an object of the present invention to provide a mixing and kneading apparatus having a sealing assembly that allows for a reliable sealing of the rotating and reciprocating working member over an extended period of time. It is a further object of the invention to provide a sealing assembly for sealing a working member located in a housing and driven to a rotating and reciprocating movement that can fulfill its function reliably over an extended period of time.

SUMMARY OF THE INVENTION

In order to meet these and other objects, the present invention provides, according to a first aspect, a mixing and kneading apparatus, comprising a housing delimiting a work space, a working member located in the interior of the housing, a drive assembly for driving the working member to a rotating and to a reciprocating movement, and a sealing assembly located between the housing and the working member.

The sealing assembly comprises a supporting assembly is located between the housing and the working member. The sealing assembly includes first sealing means and second sealing means. The supporting assembly is rotationally fixed, but coupled to the working member to perform therewith the reciprocating movement.

The first sealing means provide for a rotative sealing of the working member and is located between the working member and the supporting assembly, while the second sealing means provides for a translative sealing of the working member and is located between the supporting assembly and the housing.

According to a second aspect, the invention also provides a sealing assembly for sealing a working member located in a housing and driven to a rotating and reciprocating movement. The sealing assembly is located between the housing and the working member.

The sealing assembly comprises a supporting assembly located between the housing and the working member. It is provided with first sealing means and second sealing means. The supporting assembly is rotationally fixed, but coupled to the working member to perform therewith the reciprocating movement.

The first sealing means is adapted to provide for a rotative sealing of the working member and is located between the working member and the supporting assembly, and the second sealing means is adapted to provide for a translative sealing of the working member and is located between the supporting assembly and the housing.

By the provision of a sealing assembly comprising a supporting assembly located between the housing and the working member and adapted to receive first and second sealing means, the supporting assembly being locked against rotation but coupled to the working member to perform its reciprocating movement therewith, the sealing task can be split into two partial tasks: (1) The first sealing means serving for a rotative sealing of the working member can be located between the working member and the supporting member. (2) The second sealing means serving for a translative sealing of the working member can be located between the supporting member and the housing. By this split into two partial tasks, each sealing means can fulfill its objective in an optimal and reliable manner.

According to a preferred embodiment, the second sealing means can comprise a diaphragm. By providing a diaphragm between the housing and the supporting assembly, the materials to be processed can be prevented from proceeding behind the supporting assembly and clogging it.

BRIEF DESCRIPTION OF THE DRAWINGS

In the following, an embodiment of the apparatus according to the invention will be further described, with reference to the accompanying drawings, in which.

DETAILED DESCRIPTION OF A PREFERRED EMBODIMENT

Figure 1:
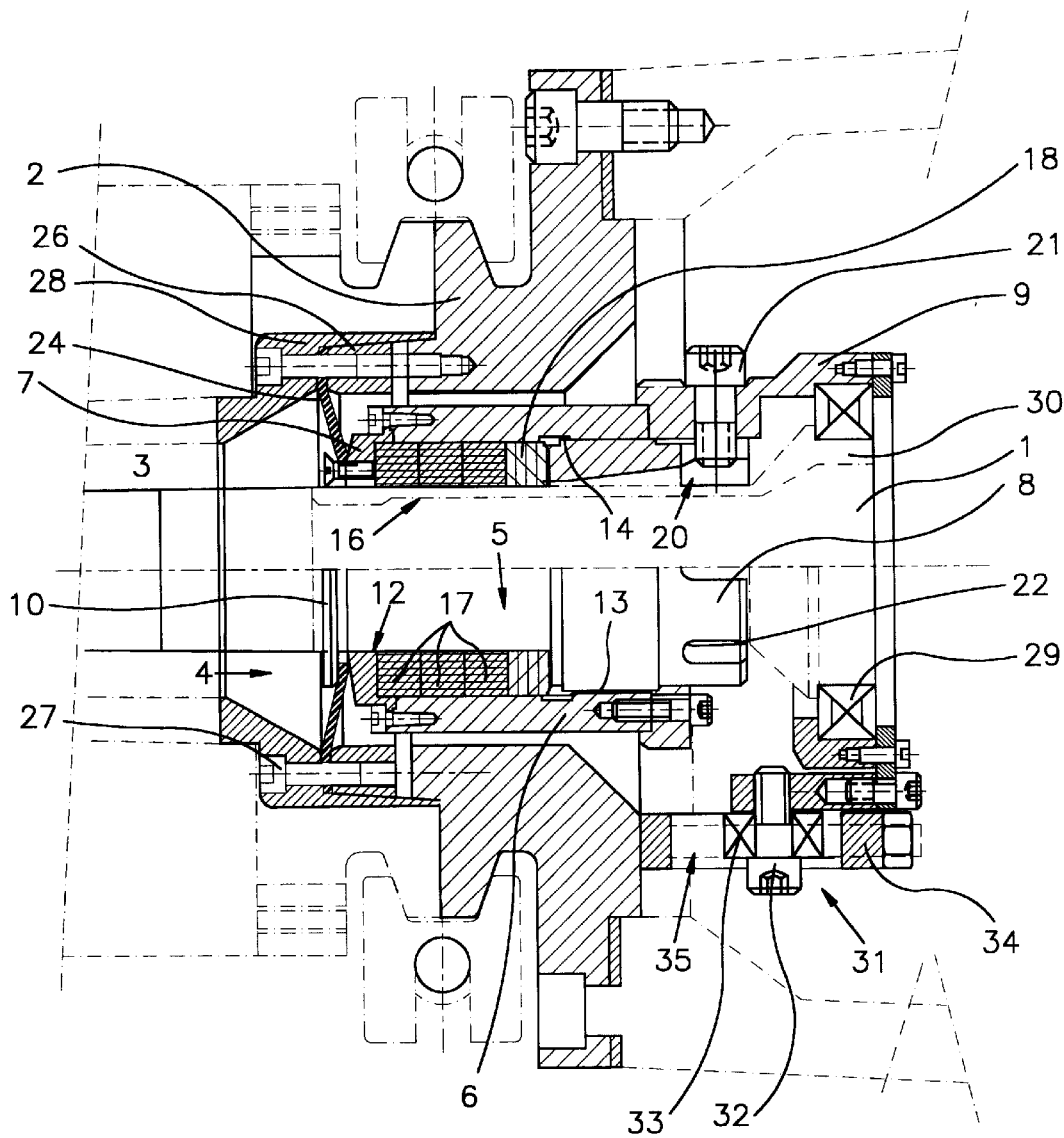
FIG. 1 shows a schematic longitudinal view of a housing and a working member of a mixing and kneading device in the region of the sealing assembly.
Figure 2:
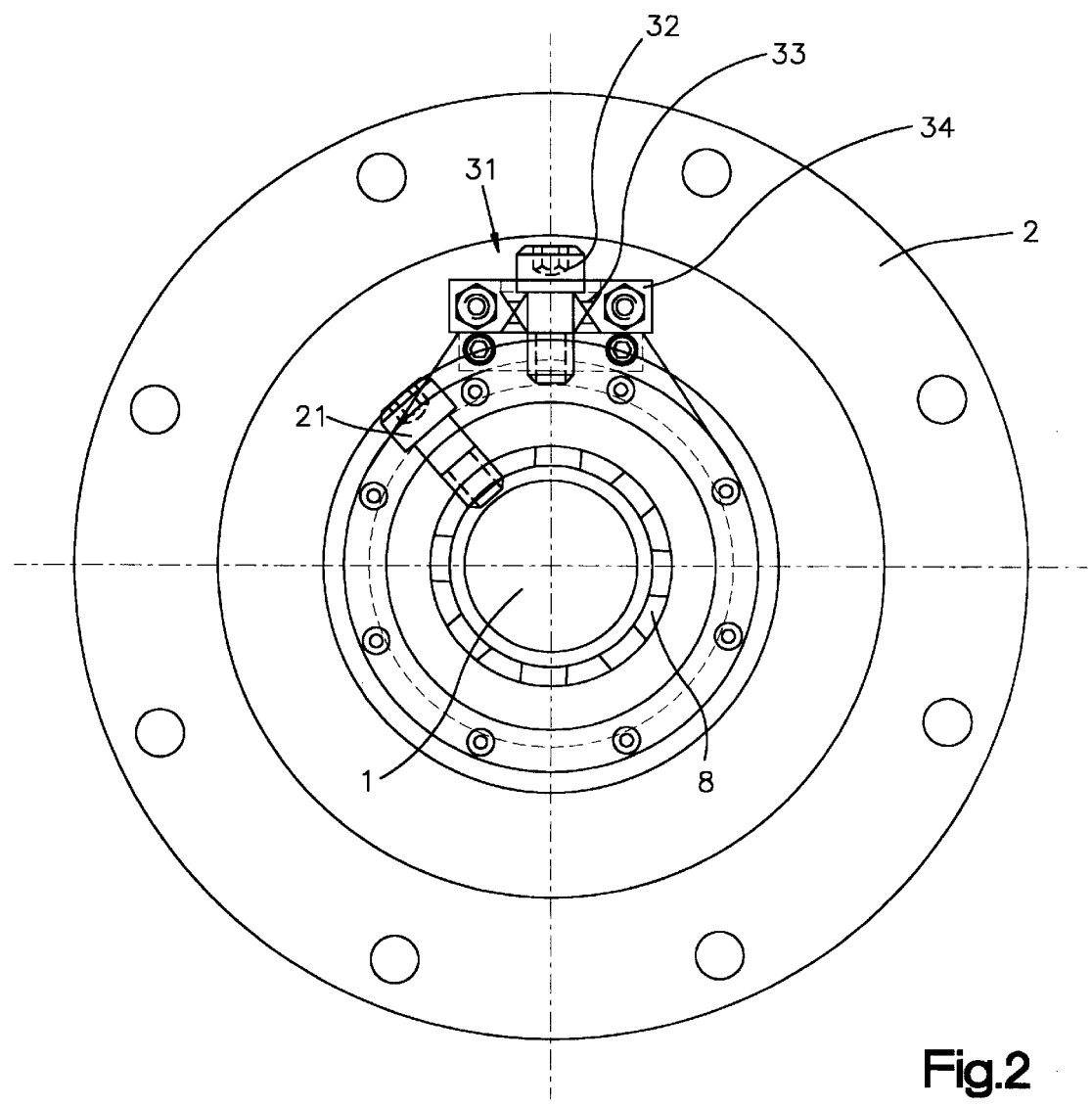
FIG. 2 shows a front elevation of the mixing and kneading device of FIG. 1.

As can be seen in FIG. 1, the mixing and kneading device essentially comprises a working member 1 received in a housing 2. It is understood that only small portions of the working member 1 and the housing 2 are shown in FIG. 1. The working member 1 may be constituted by a rotor shaft member provided with (not shown) mixing and kneading vanes. In operation, that rotor shaft member not only performs a rotating movement, but also a reciprocating movement. The space between the working member 1 and the housing 2 is schematically indicated by reference numeral 3 and constitutes the real working chamber receiving the material to be processed by the mixing and kneading device.

For sealing the working member 1 with regard to the housing 2, there is provided a sealing assembly 4 incorporating a supporting assembly 5 as a central element. The supporting assembly 5 comprises a bushing member 6, an annular member 7, a biasing member 8, an annular support member 9 and an annular biasing member 10. The annular member 7 is fixed to the end of the bushing member 6 and towers there above towards its inside; thus, a continuous peripheral stop shoulder 12 is constituted. The bushing member 6 has an end portion located remote from the above mentioned annular member 7; that end portion is provided with an internal thread 13 corresponding to an outer thread 14 provided on the biasing member 8. Clamped between the shoulder 12 of the bushing member 6 and the front face of the biasing member 8 is a first sealing means 16. This first sealing means 16 is constituted by a plurality of sealing packets 17 having rectangular cross section. A bearing ring member 18 is provided between the above mentioned sealing packets 17 and the front face of the biasing member 8. The inner diameter of the bearing ring member 18 substantially corresponds to the outer diameter of the related portion of the working member 1. On the one hand, that bearing ring member 18 prevents the sealing packets 17 from rotating relative to the bushing member 6; on the other hand, the bearing ring member 18 serves for radially supporting the supporting assembly 5 on the working member 1 inasmuch as a positioning of the sealing packets 17 with regard to the working member 1 is performed by the bearing ring member 18. Preferably, the bearing ring member 18 is made of a plastic material having good self-lubricating properties. In order to enable the biasing member 8 to be cleaned by removing material to be processed in the mixing and kneading device that has entered that biasing member 8 due to a leakage of the first sealing means 16, the diameter of the biasing member 8 conically opens up towards its rear end.

The annular support member 9 is provided with at least one threaded bore 20, and the biasing member 8 is provided with elongate recesses 22 that correspond to the threaded bore 20 as far as the position is concerned. A screw 21 is inserted into the threaded bore 20. A front portion of the screw 21 engages a recess in the biasing member 8, thus preventing the biasing member 8 from rotating. By providing that stuffing-box principle, the sealing packets can be easily clamped whereby the biasing force can be adjusted any time. The elongate shape of the recesses 22 provides for an axial movement of the biasing member 8 with relation to the screw 21. By means of the clamping force exerted onto the sealing packets 17 by the biasing member 8, the radial deformation of the sealing packets 17 and, thereby, the sealing force exerted onto the working member 1 can be varied.

The supporting assembly 5 itself is supported on a bearing 29 provided on the working member 1 by means of the annular support member 9. That bearing 29 has to fulfill the task to support the supporting assembly 5 on the working member 1 in radial direction, thereby preventing a rotation of the supporting assembly 5, and, simultaneously, to transform the reciprocating movement of the working member 1 to the supporting assembly 5. Thus, only the reciprocating movement of the working member 1, but not the rotating movement thereof, is transformed to the supporting assembly 5. Due to this measure, different sealing means, tailored to the particular application, can be provided.

In order to prevent the supporting assembly 5 from rotating, a anti-rotation lock member 31 incorporating a power pick-up device in the form of a screw 32 is provided. That anti-rotation lock member 31 is frictionally fixed to the supporting assembly 5 and supported on the housing 2 by means of a bearing 33. In order to allow for the reciprocating movement, there is provided a slot 35 machined into a guide member 34.

The second sealing means is constituted by an annular diaphragm 24 that is connected to the supporting assembly 5 by means of an annular biasing member 10. For fixing the diaphragm 24 to the housing 2, screws 27 having clamping members 26 are provided. The annular diaphragm 24 fixed to the front face of the supporting assembly 5 is preferably made of a fiber-reinforced rubber or plastic material. The annular member 7 located adjacent to the annular diaphragm 24 is provided with a front face facing the diaphragm 24 and having an inclined shape with such a configuration that the surface of the diaphragm 24 runs substantially parallel to that inclined front face when the diaphragm 24 has reached the frontmost point during its travel towards the work space 3, i.e. to the left in FIG. 1. By this design, the annular diaphragm 24 completely seals the back side of the supporting assembly 5 with regard to the working member 1 and, thereby, with regard to the material to be processed in the work space 3. In order to prevent a build-up of over-pressure in the material to be processed in the region of the diaphragm 24, that would limit the freedom of action of the diaphragm 24, an intermediate element 28 is provided that is conically tapered towards the work space 3. The smallest inner diameter of the intermediate element 28 preferably corresponds to the inner diameter of the work space 3. The annular diaphragm 24 is provided with a wear resistant surface on that side that faces the work space 3. For example, such a wear resistant surface can be constituted by a woven layer made of plastic material or metal vulcanized into the material of the diaphragm 24. By the provision of such a wear resistant surface layer, also abrasive materials can be processed in the work space 3 of the mixing and kneading device.

In order to increase the abrasion hardness of the working member 1 in the region of the supporting assembly 5 and the first sealing means 16, respectively, the working member 1 is provided with a jacket member 30 having essentially tube-like shape whose surface is matched to the specific requirements.

Thus, it can be summed up that the required sealing means 16, 24 can be optimally matched to their tasks by a design as previously described, i.e. by providing a sealing assembly 4 including a supporting assembly 5 inserted between the working member 1 and the housing 2 and which is rotationally fixed, but coupled to the working member 1 to follow its reciprocating motion. The first sealing means 16 provided between the working member 1 and the supporting assembly 5 seals the working member 1 as far as its rotating movement is concerned, and the second sealing means, in the form of the annular diaphragm 24, located between the supporting assembly 5 and the housing 2, seals the working member 1 is far as its reciprocating movement is concerned.

It is understood that the embodiment shown in the drawings and explained herein before does not have any limiting character whatsoever; in contrary, within the scope of the appended claims, mixing and kneading devices having sealing assemblies different from the foregoing embodiment may be realized.

What is claimed is:

1. A mixing and kneading apparatus comprising:
a housing delimiting a work space;
a working member extending into said work space and being rotatable and reciprocable relative to said housing;
a sealing assembly located between said housing and said working member, said sealing assembly being rotationally fixed to said housing and being fixed to said working member for reciprocal movement with said working member;
first sealing means being supported by said sealing assembly and being interposed between said sealing assembly and said working member for providing rotary sealing of said working member in said housing; and
second sealing means being interposed between said sealing assembly and said work space for providing reciprocal sealing of said working member in said housing, a first portion of said second sealing means being supported by said housing and a second portion of said second sealing means being supported by said sealing assembly, said first and second portions of said second sealing means extending radially between said housing and said sealing assembly.

2. A mixing and kneading apparatus according to claim 1, further comprising an intermediate member means located between said sealing assembly and said work space, said intermediate member means conically tapering towards said work space.

3. A mixing and kneading apparatus according to claim 1 in which a supporting assembly comprises a tubular shaped bushing means surrounding said working member means, said first sealing means being provided at an inner side of said bushing means.

4. A mixing and kneading apparatus according to claim 3 in which said bushing means comprises a first end region and a second end region, said first end region being provided with an radially inwardly towering stop shoulder means and said second end region being provided with an inner thread means, said supporting assembly further comprising an annular biasing means provided with an outer thread means corresponding to said inner thread means of said bushing means, such that said first sealing means can be clamped between said stop shoulder means of said bushing means and a front face of said biasing means.

5. A mixing and kneading apparatus according to claim 4 in which said biasing means has an inner diameter that conically increases from said front face adjacent to said first sealing means.

6. A mixing and kneading apparatus according to claim 3 in which a diaphragm means is fixed to said bushing means by means of an annular biasing member.

7. A mixing and kneading apparatus according to claim 1 in which said supporting assembly comprises a bearing ring means having an inner diameter that substantially corresponds to the outer diameter of said working member means in the concerning area thereof.

8. A mixing and kneading apparatus according to claim 7 in which said bearing ring means is located between said first sealing means and a front face of a biasing means.

9. A mixing and kneading apparatus according to claim 1 in which said supporting assembly further comprises an annular support means that is coupled for translation relative to said working member means by means of a bearing means.

10. A mixing and kneading apparatus according to claim 9 in which said annular support means is provided with at least one threaded bore and a biasing means is provided with several elongate recesses whose axial positions correspond to the position of said threaded bore, whereby screw means are provided that can be screwed into said threaded bore to prevent a rotation of said biasing means.

11. A mixing and kneading apparatus according to claim 1 in which said supporting assembly has a first end region and a second end region opposite to said first end region, a bearing means being located in said first end region and said second sealing means being located in said second end region.

12. A mixing and kneading apparatus according to claim 1 in which said second sealing means comprises a diaphragm means.

13. A mixing and kneading apparatus according to claim 12 in which said diaphragm means is provided with a wear resistant surface layer on that surface that faces said working space.

14. A mixing and kneading apparatus according to claim 12 in which said diaphragm means is fixed to a front face of said supporting assembly.

15. A mixing and kneading apparatus according to claim 14 in which said front face of said supporting assembly facing said diaphragm means is inclined.

16. A mixing and kneading apparatus according to claim 1, further comprising anti-rotation means adapted to prevent a rotation of said supporting means with regard to said housing means.

17. A mixing and kneading apparatus according to claim 16 in which said anti-rotation means includes a lock means that is frictionally fixed to said supporting assembly and supported on said housing means by means of a bearing means.

18. A mixing and kneading apparatus according to claim 1 in which said working member means is provided with a substantially tube-shaped jacket means located in the region of said supporting assembly and having a wear-resistant surface.

* * * * *